United States Patent Office 2,951,071
Patented Aug. 30, 1960

2,951,071

NEW MONOAZO DYESTUFFS

Colin George Tilley, Manchester, England, assignor to Imperial Chemical Industries Limited, London, England, a corporation of Great Britain No Drawing. Filed Oct. 27, 1958, Ser. No. 769,590

Claims priority, application Great Britain Oct. 30, 1957

8 Claims. (Cl. 260—153)

This invention relates to new monoazo dyestuffs. More particularly it relates to new monoazo dyestuffs of the triazine series, especially valuable for the formation of red to orange shades on cellulose textile materials, said shades being fast to washing and to bleach treatments.

In United Kingdom specification No. 209,723 there is described the manufacture of azo dyestuffs by synthesising dyestuffs containing one or more cyanuric nuclei, (1) by uniting together or with other suitable components by reactions which lead to the formation of azo dyestuffs, intermediate products containing one or more cyanuric nuclei, or (2) by uniting azo dyestuffs containing appropriate groupings, either to each other or to other complexes, radicals or suitable residues by reaction with the halogen of cyanuric halides.

In the said specification there is described, as a dyestuff intermediate, the monoazo compound obtained by coupling diazo-m-xylene with the condensation product of equimolecular proportions of cyanuric chloride and 2-amino-5-naphthol-7-sulphonic acid.

In United Kingdom specification No. 785,120 there are described monoazo dyestuffs for cellulosic textile materials obtainable by coupling the diazo compounds of certain orthanilic acids with the condensation products of equimolecular proportions of cyanuric chloride and 2-amino-5-naphthol-7-sulphonic acid, or an N-alkyl derivative thereof.

However, all the monoazo compounds previously described which are obtained using the condensation products mentioned in the previous paragraphs as coupling components have a serious technical failing in that they have poor fastness to bleaching treatments with aqueous hypochlorite solutions.

It is an object of the present invention to provide monoazo dyestuffs having good fastness to washing which also have good fastness to bleaching treatments with aqueous hypochlorite solutions.

It has now been found that certain monoazo dyestuffs of the azonaphthalene series, are particularly valuable dyestuffs for cotton and other cellulosic textile materials, when applied thereto by the processes described in United Kingdom specification No. 797,946 or by the related processes described in United States applications Nos. 652,681 and 652,682. The new monoazo dyestuffs when so applied give orange to red shades having a surprising fastness to washing and to bleach treatments using aqueous hypochlorite solutions.

According to the present invention there are provided new monoazo dyestuffs which, in the acid form, are represented by the formula:

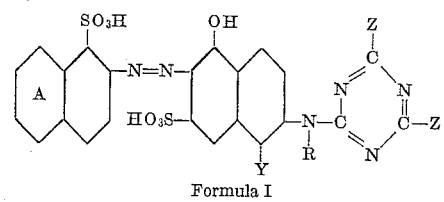

Formula I wherein the naphthalene nucleus A may contain one or more additional sulphonic acid groups, Y stands for a hydrogen or a chlorine atom or for a sulphonic acid group, R stands for a hydrogen atom or a lower alkyl group, and Z stands for chlorine or bromine.

As examples of alkyl groups represented by R there may be mentioned secondary and tertiary alkyl, such as iso-propyl, iso-butyl, and t-butyl, but preferably R represents a hydrogen atom or a primary alkyl group of 1 to 4 carbon atoms, i.e. a methyl, ethyl, n-propyl, or n-butyl group.

According to a further feature of the invention there is provided a process for the manufacture of the new monoazo dyestuffs which comprises coupling diazotised 2-naphthylamine-1-sulphonic acid or a derivative thereof containing one or more additional sulphonic acid groups, with a compound of the formula:

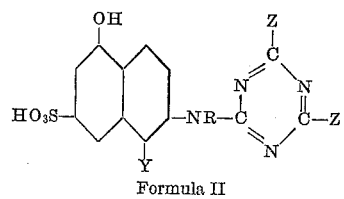

Formula II wherein R, Y and Z have the meanings given above.

Suitable diazo components include for example 2-naphthylamine-1-sulphonic acid, 2-naphthylamine-1:5-disulphonic acid and, preferably, 2-naphthylamine-1:5:7-trisulphonic acid.

The compounds of Formula II may be obtained by methods in themselves well known for example by interaction of an aminonaphthol sulphonic acid of the formula:

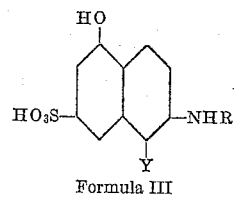

Formula III wherein R and Y have the meanings given above with at least one molecular proportion of cyanuric chloride or cyanuric bromide under such conditions that two halogen atoms remain attached to the triazine ring; for example by carrying out the interaction at a relatively low temperature, usually below 5° C., in a slightly acid to neutral aqueous medium.

Suitable amino-naphthol sulfonic acids of Formula III include, for example, 2-amino-5-naphthol-7-sulphonic acid, 2-methylamino-5-naphthol-7-sulphonic acid, 2-n-butylamino-5-naphthol-1:7-disulphonic acid, 2-propylamino-1-chloro-5-naphthol-7-sulphonic acid and 2-amino-5-naphthol-1:7-disulphonic acid. Those containing N-alkyl groups occasionally require a somewhat higher temperature than 5° C. for the interaction with the cyanuric halide.

The process of the invention is preferably carried out in a slightly acid or neutral aqueous medium in order to prevent, so far as be possible, the removal by hydrolysis of the halogen atoms attached to the triazine ring.

Similarly in order to avoid such hydrolysis it is preferred to isolate the new dyestuffs under slightly acid conditions, from the media in which they have been formed, especially in the presence of a suitable buffer, such as a mixture of acid salts of phosphoric acid, or a mixture of a N:N-dialkyl arylamine sulphonic acid and its salt. The products so obtained have a greatly increased stability to storage.

According to a further feature of the invention there is provided a modified process for the manufacture of the new dyestuffs which comprises interacting at least one molecular proportion of cyanuric chloride or cyanuric bromide with an aminoazo compound of the formula:

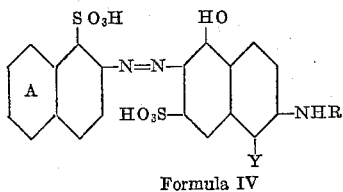

Formula IV wherein R and Y have the meanings given above and the naphthalene nucleus A may contain one or more additional sulphonic acid groups.

The aminoazo compounds of Formula IV may be obtained by coupling a diazo component as exemplified and used in the process described above, with an aminonaphthol sulphonic acid of Formula III above under strongly alkaline conditions, or with a N-acyl derivative, especially the acetyl derivative, of the amino-naphthol sulphonic acid, in which case it is sufficient to use mildly alkaline conditions for the coupling stage. The N-acyl group must then be removed from the resulting azo compound by hydrolysis, for example by heating with dilute aqueous sodium hydroxide.

The condensation of the cyanuric halide with the aminoazo compound of Formula IV is preferably carried out in aqueous medium at as low a temperature as possible and advantageously in the presence of an acid-binding agent such as sodium carbonate or sodium bicarbonate which is added to keep the reaction medium close to neutrality.

The new dyestuffs of the invention, in the form of their alkali-metal salts, are readily soluble in water. They are especially useful for the colouration of cellulosic textile materials in conjunction with a treatment with an acid-binding agent, for example by the process described in British specification No. 797,946, wherein the coloured textile material is aftertreated with an acid-binding agent, or by related processes wherein an acid-binding agent is applied to the textile material before or during the treatment with the dyestuff.

The new monoazo dyestuffs may also be used to colour textile materials of wool, silk and other natural protein fibres and artificial fibres such as fibres of ardein, casein, polyamide and modified polyacrylonitrile, by the methods commonly used for the dyeing of such textile materials, that is by treating the textile material with a hot neutral or weakly acid aqueous solution of the dyestuff. The new monoazo dyestuffs when so applied give orange to red shades having a surprising fastness to washing and to bleach treatments using aqueous hypochlorite solutions.

The invention is illustrated but not limited by the following examples in which parts and percentages are by weight:

Example 1

Diazotized 2-naphthylamine-1:5-disulphonic acid is coupled with 2-amino-5-naphthol-7-sulphonic acid and 61.9 parts of the trisodium salt of the aminoazo compound obtained are dissolved in 800 parts of water.

A solution of 18.8 parts of cyanuric chloride in 140 parts of acetone is poured into a mixture of 400 parts of ice and 300 parts of water. The solution of aminoazo compound is then added at such a rate that the temperature of the mixture remains below 3° C. The pH of the mixture is kept within the range 6 to 7 by addition of 10% aqueous sodium carbonate solution.

When no unchanged amino azo compound can be detected in the reaction mixture, 20 parts of a 1:1.8 mixture of disodium hydrogen phosphate and potassium dihydrogen phosphate are dissolved in 100 parts of water and added and the mixture is filtered. 15 parts of the mixture of disodium hydrogen phosphate and potassium dihydrogen phosphate are added to the product on the filter and the mixture is washed with a large volume of acetone, refiltered and dried at 20° C.

The dyestuff so obtained is found to contain 2.17 atoms of hydrolysable chlorine for each azo group. It dyes cellulosic materials in reddish orange shades having very good fastness to bleaching treatments, washing and light. This dyestuff may be named: 1-hydroxy-2-(2'-naphthylazo) - 6-(dichloro-s-triazinylamino) - naphthylene-1',5',3-disulfonic acid.

Example 2

Diazotized 2-naphthylamine-1-sulphonic acid is coupled with 2-amino-5-naphthol-7-sulphonic acid and 61.9 parts of the trisodium salt of the aminoazo compound obtained are dissolved in 3200 parts of water and condensed with cyanuric chloride as described in Example 1 except that an additional 8 parts of cyanuric chloride were added to the mixture after 6 hours.

The dyestuff so obtained contains 2.0 atoms of hydrolysable chlorine for each azo group. It dyes cellulosic materials in reddish orange shades having very good fastness to bleaching treatments, to washing and to light. This dyestuff may be named: 1-hydroxy-2-(2' - naphthylazo)-6-(dichloro-s-triazinylamino) - naphthylene-1',7-disulfonic acid.

Example 3

Diazotized 2-naphthylamine-1:5-disulphonic acid is coupled with 2-methylamino-5-naphthol-7-sulphonic acid under alkaline conditions and 63.3 parts of the trisodium salt of the resulting monoazo compound obtained are dissolved in 1000 parts of water and condensed with 19.0 parts of cyanuric chloride as described in Example 1.

The dyestuff so obtained contains 2.00 atoms of hydrolysable chlorine for each azo group. It dyes cellulosic materials in bright reddish orange shades having good fastness to severe washing treatments and bleaching treatments. This dyestuff may be named: 1-hydroxy-2-(2'-naphthylazo) - 6 - (dichloro-s-triazinyl - N - methylamino)-naphthylene-1',5',3-trisulfonic acid.

Example 4

Diazotised 2-naphthylamine-1:5-disulphonic acid is coupled with 2-amino-5-naphthol-1:7-disulphonic acid under alkaline conditions and 72.1 parts of the tetrasodium salt of the aminoazo compound obtained are dissolved in 4400 parts of water and condensed with 19.0 parts of cyanuric chloride as described in Example 1.

The dyestuff so obtained contains 1.88 atoms of hydrolysable chlorine for each azo group present. It dyes cellulosic materials in reddish orange shades having very good fastness to washing and to bleaching treatments. This dyestuff may be named: 1-hydroxy-2-(2'-naphthylazo)-6-(dichloro - s - triazinylamino)-naphthylene-1',5',3,5-tetrasulfonic acid.

Example 5

Diazotised 2-naphthylamine-1:5:7-trisulphonic acid is coupled with 2-amino-5-naphthol-7-sulphonic acid and 72.1 parts of the tetra sodium salt of the aminoazo compound obtained are dissolved in 1200 parts of water.

A solution of 18.8 parts of cyanuric chloride in 140 parts of acetone is poured into a mixture of 400 parts of ice and 400 parts of water. The solution of the aminoazo compound is then added at such a rate that the temperature of the mixture remains below 3° C. The pH of the solution is kept within the range 6 to 7 by addition of 10% aqueous sodium carbonate solution.

When no unchanged aminoazo compound can be detected in the reaction mixture, 24 parts of a mixture of N:N-diethylmetanilic acid and its sodium salt, which when dissolved in water gives a solution of pH 6.5, dissolved in 100 parts of water are added. The mixture is filtered and filter cake is washed well with acetone. To the cake is added 12 parts of a mixture of N:N-diethylmetanilic acid and its sodium salt, which when dissolved in water gives a solution of pH 6.5, and it is then dried at 20° C.

The dyestuff so obtained is found to contain 1.89 atoms of hydrolysable chlorine for each azo group. It dyes cellulosic materials in orange shades having very good fastness to bleaching treatments, washing and light. This dyestuff may be named: 1-hydroxy-2-(2'-naphthylazo)-6-(dichloro - s - triazinylamino)-naphthylene-1',5',7',-3-tetrasulfonic acid.

What I claim is:

1. Monoazo dyestuffs which, in the acid form, are represented by the formula:

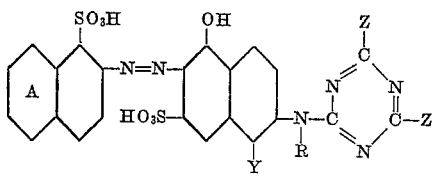

wherein the naphthalene nucleus A is substituted by members selected from the class consisting of hydrogen and sulfonic acid, Y stands for a substituent selected from the group consisting of hydrogen, chlorine and a sulphonic acid group, R stands for a member selected from the group consisting of hydrogen atom and a lower alkyl group, and Z stands for a halogen atom selected from the group consisting of chlorine and bromine.

2. Monoazo dyestuffs according to claim 1 wherein the naphthyl radical A is 1:5:7-trisulpho-2-naphthyl.

3. Monoazo dyestuffs according to claim 1, wherein the naphthyl radical A is 1:5-disulfo-2-naphthyl.

4. 1 - hydroxy - 2 - (2' - naphthylazo) - 6 - (dichloro-s - triazinylamino) - naphthylene - 1',5',3 - trisulfonic acid.

5. 1 - hydroxy - 2 - (2' - naphthylazo) - 6 - (dichloro-s - triazinyl - N - methyl - amino) - naphthylene - 1',5',3-trisulfonic acid.

6. 1 - hydroxy - 2 - (2' - naphthylazo) - 6 - (dichloro-s - triazinylamino) - naphthylene - 1',7 - disulfonic acid.

7. 1 - hydroxy - 2 - (2' - naphthylazo) - 6 - (dichloro-s - triazinylamino) - naphthylene - 1',5',3,5 - tetrasulfonic acid.

8. 1 - hydroxy - 2 - (2' - naphthylazo) -6 - (dichloro-s - triazinylamino) - naphthylene - 1',5',7',3 - tetrasulfonic acid.

References Cited in the file of this patent
UNITED STATES PATENTS

| | | |
|---|---|---|
| 1,667,312 | Fritzsche et al. | Apr. 24, 1928 |
| 2,860,128 | Gunst | Nov. 11, 1958 |
| 2,873,269 | Fasciati et al. | Feb. 10, 1959 |